US006710473B2

(12) United States Patent
Maksimov et al.

(10) Patent No.: US 6,710,473 B2
(45) Date of Patent: Mar. 23, 2004

(54) CURRENT CONDUCTING PART OF A POWER TRANSMISSION LINE

(76) Inventors: Aleksander Maksimov, Viale Italia, 353, 19125 La Spezia (IT); Peter Novak, Mozarts Traat 20, 2018 Antwerp (BE)

( * ) Notice: Subject to any disclaimer, the term of this patent is extended or adjusted under 35 U.S.C. 154(b) by 0 days.

(21) Appl. No.: 10/040,753

(22) Filed: Nov. 9, 2001

(65) Prior Publication Data

US 2003/0090159 A1 May 15, 2003

(51) Int. Cl.$^7$ ................................. H04B 3/28
(52) U.S. Cl. ............................. 307/89; 333/12
(58) Field of Search ................... 307/89, 91; 174/32, 174/35 C; 333/12

(56) References Cited

U.S. PATENT DOCUMENTS

| | | | | |
|---|---|---|---|---|
| 3,609,208 A | * | 9/1971 | Winpisinger | 174/31 |
| 5,068,543 A | * | 11/1991 | Ohkawa | 307/91 |
| 5,198,746 A | * | 3/1993 | Gyugyi et al. | 323/207 |
| 5,360,998 A | * | 11/1994 | Walling | 307/91 |
| 5,365,115 A | * | 11/1994 | Kalyon et al. | 307/89 |
| 5,920,130 A | * | 7/1999 | Paschen et al. | 307/91 |
| 5,965,956 A | * | 10/1999 | Boehme et al. | 307/91 |

OTHER PUBLICATIONS

A.R. Memari et al., Mitigation of Magnetic Field Near Power Lines, Jul. 1996, IEEE Transactions on Power Delivery, vol. 11, No. 3., pp. 1577–1586.*

John F. Heneage, P.E. et al., An EMF Mitigation Technology for Power Transmission Lines, INAPHASE Technologies, No Date, pp. 468–473.*

* cited by examiner

*Primary Examiner*—Gregory J. Toatley, Jr.
*Assistant Examiner*—Sharon A. Polk
(74) *Attorney, Agent, or Firm*—Akerman Senterfitt

(57) ABSTRACT

An electrical power transmission line includes an electrical conductor including a plurality of interconnected individual current conducting sections and a conducting section connector disposed between the conducting sections. At least a portion of the section connectors include at least one retunable inductance connected in series between respective conducting sections. Random variation of the retunable inductors results in averaging at least one of the first, second and third directional derivatives of vector potential of electromagnetic waves traveling in the adjacent conducting sections, thereby becoming undefined.

8 Claims, 1 Drawing Sheet

Modified aerial electric power transmission line.

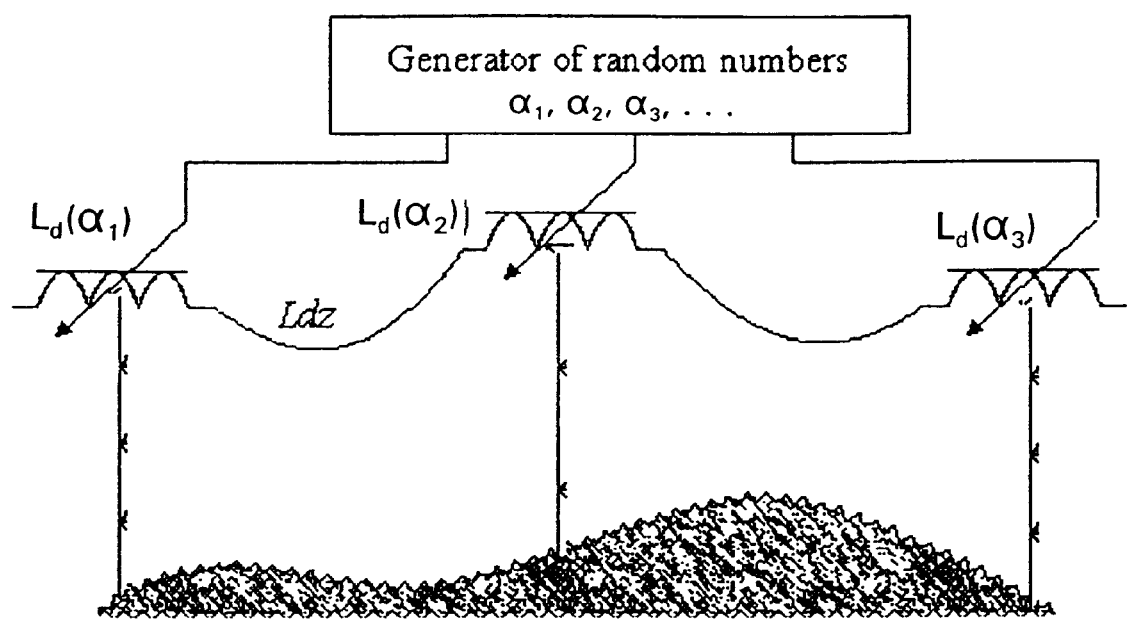
Figure 1. Modified aerial electric power transmission line.

CURRENT CONDUCTING PART OF A POWER TRANSMISSION LINE

CROSS-REFERENCE TO RELATED APPLICATIONS

Not applicable.

STATEMENT REGARDING FEDERALLY SPONSORED RESEARCH OR DEVELOPMENT

Not applicable.

1. Field of Invention

The invention relates to the field of electric power transmission and distribution, more particularly to electric power transmission lines having retunable elements for reducing harmful EMF related emissions.

2. Background of the Invention

A transmission line can be considered to be any structure that can transfer electromagnetic energy between two points. There are many different types of transmission lines including coaxial, strip line, parallel wire and parallel plate. Regarding power line transmission of energy, parallel wire is generally used.

Numerous studies have been conducted on the relationship between power line EMF and serious disease. The official U.S. government view is that EMF may cause cancer, especially in children. There have also been suggestions that EMF may lead to miscarriages and other harmful effects.

Countries other than the U.S. have also been concerned with EMF originating from power lines. For example, because of health concerns, Spain, Norway, Sweden, the UK and Australia now prohibit the construction of power lines within 300 feet of homes.

One proposed method for avoiding or at least reducing potentially harmful EMF exposure is by burying power lines. However, some have argued that this would not significantly reduce the harmful EMF radiated by power lines. Even if effective, burying of power lines is very expensive and is not possible in certain regions, such as regions prone to flooding.

SUMMARY OF THE INVENTION

A current conducting part of an electrical power transmission line and electrical power transmission line for reducing harmful EMF related emissions includes a plurality of interconnected individual conducting sections, and a plurality of conducting section connectors disposed between the conducting sections. At least one of the section connectors include at least one retunable inductor element connected in series between respective ones of the conducting sections. The retunable inductors can provide random variation in magnetic permeability ($\mu$) on adjacent current conducting sections. Such an arrangement can result in averaging of at least one of the first, second and third directional derivatives of vector potential of electromagnetic waves traveling in adjacent conducting sections. Averaging of respective derivatives renders the same undefined.

Averaging at least one of at least one of the first, second and third directional derivatives of vector potential of electromagnetic waves traveling current conducting sections can eliminate or at least substantially reduce operation in the concurrence of mode condition that can exist in the power lines. During the concurrence of mode condition, self-sustained oscillations of the power lines can occur, resulting in excitation of chemical bonds in the power line material and emission of harmful EMF. Harmful EMF can also excite molecules in materials outside power supply lines and is emitted due to pulses of energy which transfer energy between respective oscillation modes which occurs during operation in the concurrence of mode condition.

Harmful EMF related emissions from power lines have been determined to occur primarily during periods in which the concurrence of mode conditions condition exists in the power lines. As a result of eliminating or substantially reducing the occurrence of concurrence of mode operation of power lines, harmful EMF related emissions from power lines can be reduced.

The transmission line can include at least one random number generator for controlling variation of the retunable inductances. As used herein, the term "random numbers" and "random number generators" includes pseudo-random numbers and pseudo-random number generators, respectively.

A structure for calculating values of the retunable inductors can also be provided. Values calculated and used for varying inductances are preferably comparable to the inductance of the section of the wire (cable) enclosed between the two tunable inductors between the retunable inductors and a load.

The transmission line can also include a structure for varying the retunable inductors. The structure for varying can be an electrical, mechanical or electromechanical device.

A method of transmitting electric power with reduced harmful EMF emissions includes the steps of providing a plurality of interconnected individual current conducting wire sections and a conducting section connector disposed between the conducting sections. At least one of the section connectors includes at least one retunable inductance connected in series between respective ones of the conducting sections. The retunable inductance are capable of causing random variation in magnetic permeability ($\mu$) on adjacent ones of the conducting sections, wherein at least one of first, second and third directional derivatives of vector potential of electromagnetic waves traveling in adjacent conducting section can be averaged, thereby becoming undefined.

The method includes the step of randomly varying the effective magnetic permeability ($\mu$) on at least one of the conducting sections. The random variation can result in averaging at least one of the first, second and third directional derivatives of vector potential of electromagnetic waves traveling in adjacent conducting sections. This averaging can eliminate or at least substantially reduce operation in the concurrence of mode condition that can exist in the power lines.

The random variation can be produced by randomly varying values of the retunable inductances. The method can include the step of controlling the random variation. Random variation of inductances can be controlled by at least one random number generator.

BRIEF DESCRIPTION OF THE DRAWINGS

A fuller understanding of the present invention and the features and benefits thereof will be accompanied upon review of the following detailed description together with the accompanying drawings, in which:

FIG. 1 illustrates an aerial electric power transmission line having a plurality of dynamic elements for reducing harmful EMF emissions, according to an embodiment of the invention.

DETAILED DESCRIPTION OF THE PREFERRED EMBODIMENTS

The invention is a current conducting part of an electric power transmission line having dynamic elements for substantially reducing or eliminating harmful EMF emissions and a method for the same. Harmful EMF emissions have been determined to occur primarily during periods in which the concurrence of mode condition exists in the power line. During the concurrence of mode condition, self-sustained oscillations of the power lines occur, resulting in excitation of chemical bonds in the power line material and emission of harmful EMF. Harmful EMF is emitted due to pulses of energy which transfer energy between respective oscillation modes which occurs during the concurrence of mode condition.

Dynamic elements are disposed between lengths of the electrical power line. These dynamic elements can eliminate, or at least substantially reduce, harmful EMF emissions which can occur during concurrence of modes operation of electric power transmission lines. In addition, electric power transmission line electrical energy losses can be somewhat reduced. The invention can be applied to aerial electrical transmission lines as well as other transmission lines.

In copending patent application Ser. No. 10/040,598 entitled "Method and Apparatus for Excitation of Chemical Bonds" by the same inventors as the instant application, the process of interaction between an appropriate electromagnetic field and matter which can lead to excitation of electrons involved in chemical bonds of the matter is described. The excitation of electrons involved in chemical bonds can occur when the vector potential ($\vec{A}$) is an electromagnetic field satisfies two conditions.

The first condition for excitation involves the directional derivatives of vector potential ($\vec{A}$) of the applied electromagnetic field. For excitation to occur, the first, second and third directional derivatives for the vector potential ($\vec{A}$) shown below must be simultaneously defined:

$$\vec{A}' \equiv \frac{\partial \vec{A}}{\partial r} \quad \vec{A}'' \equiv \frac{\partial^2 \vec{A}}{\partial r^2} \quad \vec{A}''' \equiv \frac{\partial^3 \vec{A}}{\partial r^3}$$

The first derivative, scalar potential (or voltage), should be defined inside the wire, between wires and between the wires and earth. The second derivative, electric current, should be defined inside wire. The third derivative, electromotive force of self-inductance per meter of wire, should be defined inside the wire. Assuming the first, second and third directional derivatives above are simultaneously defined, the wave of vector potential (A) can be expressed in the following form which is derived from the solution of the D'Alembert equation for the wave of vector potential:

$$\vec{A} = \frac{\vec{A}\big|_{t=0}}{2} + \frac{1}{4}\int_{r-at}^{r+at} \vec{A}'\big|_{t=0} dr + \frac{1}{4}\int_{r-at}^{r+at} dr \int_{r-at}^{r+at} \vec{A}''\big|_{t=0} dr$$

Where a is the phase velocity of the wave and r is the spatial coordinate of the propagating wave. The second condition for excitation of electrons involved in chemical bonds is that the damping of the electromagnetic wave oscillations in the direction of their propagation should occur either faster or slower, but not equal, to exponential wave oscillations of type $e^{-\alpha r} e^{-lkr}$.

If both these requirements are simultaneously satisfied by an electromagnetic wave, the wave provides a component of vector potential ($\vec{A}$) which can excite electrons involved in chemical bonding in matter. The specific component of vector potential (SVP) has the following form:

$$\vec{A} \sim \vec{A_0} * 2at\left(1 - \frac{r}{2at}\right)$$

Where Ao is constant amplitude and t is the time (synchronization time) corresponding to the simultaneous existence of the directional derivatives of the first, second and third order for the vector potential ($\vec{A}$).

A SVP can be produced by electric, magnetic, mixed electric and magnetic systems (lines), the systems having distributed parameters. These systems can generate a specific component of the vector potential wave when the system is in a concurrence of modes condition.

In accordance with theoretical basics of electrical engineering [2], a power transmission line can be considered as an electrical line with distributed parameters. In such a line at certain instants of time, current and voltage can be different and continuously changing at any two neighboring points, such as between two cross-sections of the power line. Accordingly, current and voltage values at points along a line are functions of time and spatial coordinates.

Continuous changes in current and voltage values along a power transmission line occur because electric power transmission lines have distributed longitudinal and lateral elements. Longitudinal elements are formed by the frequency dependent active resistances (reactances) of the wires of the line and by the inductances of the two opposite line sections with length dx. Lateral elements consist of leakage resistances, formed as a result of imperfections in the electrical insulation between the wires of the line and capacitances formed by the opposite sections (elements) of the line.

During atmospheric perturbations, such as during lightening discharges, transients signals are known to couple into electric power lines. In particular, when there is a silent electrical discharge, known as a corona discharge, between the wires of the line, the capacitance between opposite sections of the line become a function of voltage between the respective sections. In this case, a high voltage electric power transmission line becomes a nonlinear electrical line with distributed parameters. As a result, current and voltage oscillations in the electrical power line can result. The most important oscillations are:

1. Oscillations on the highest harmonic.
2. Sub-harmonic oscillations with the frequency equal to $\omega/n$.
3. Oscillations with the frequency equal to $m\omega/n$, where m and n are integer numbers.
4. Self-modulation.
5. Chaotic oscillation and alternating resonances.

Therefore, perturbing atmospherics, such as lightening discharges, can lead to the power transmission line becoming a multi-mode self-sustained oscillation system with distributed parameters. As a result, such a system can operate in the concurrence of modes condition. Operation in the concurrence of modes condition results in power transmission lines supporting electromagnetic fields propagating therein having a vector potential (A) component capable of exciting chemical bonds in molecules of the power line material as well as in molecules of materials outside of the power supply lines.

In accordance with [3], the rise of multi-mode oscillations in power transmission lines leads to losses of electrical energy. Losses result not only due to the leakage currents but also due to the excitation of the chemical bonds in the material of the wires on the given section of the line and in the materials of the objects on the ground nearby this line section.

As noted above, an electromagnetic field can excite chemical bonds in matter, provided directional derivatives of the first, second and third order for the vector potential are all defined and damping of the electromagnetic wave oscillations in the direction of their propagation occur either faster or slower, but not equal, to exponential wave oscillations of type $e^{-\alpha r} e^{-lkr}$. Hence, if any of the directional derivatives of vector potential ($\vec{A}$) are not defined, the corresponding electromagnetic field cannot excite chemical bonds in molecules of matter.

Thus, self-sustained oscillations in the concurrence of mode conditions can be prevented or at least reduced in electric power lines if electromagnetic fields propagating therein are forced to have at least one of the three directional derivatives (first, second or third order) of vector potential be undefined.

Electric power lines are known to satisfy the condition of quasi-statics shown below [4]:

kD<<1

Where k is the wave number and D is the maximum dimension of the power line in all three dimensions, the maximum dimension generally being the length of the wire.

The quasi-statics condition is a consequence of the locality of the electric and magnetic fields. Thus, the electric and magnetic fields in power lines can be defined exclusively by the capacitance and inductance of discrete sections of the transmission line and do not depend on the currents and charges on the other sections of the line. As a result, in the traveling wave propagating in the line, the phases of current and electric charge in wires remain practically constant on the length of line equal to the several units of distance between wires. Current and electrical charges on such a section of line will form the main part of the field and other sections of the line will add only small corrections to this field [4].

Electric power transmission lines may be characterized through the effective electric permittivity $\epsilon$ and effective magnetic permeability $\mu$, which are functions of the geometrical form and sizes of the line, the values of electric permittivity and magnetic permeability of the media between wires and wires [4].

It follows from [1] that electric permittivity and magnetic permeability are connected with the second and third directional derivatives of vector potential by the following expressions:

$$\vec{A}'' = \frac{\partial}{\partial r}\left(\frac{\sqrt{\varepsilon\mu}}{c}\vec{\nabla}\varphi\right) = \frac{\sqrt{\varepsilon\mu}}{c}\left\{\frac{\vec{\nabla}\varphi}{2}\left(\frac{\mu'}{\mu} + \frac{\varepsilon'}{\varepsilon}\right) + (\vec{\nabla}\varphi)'\right\} \quad 1$$

$$\vec{A}'' = \mu\mu_0 \vec{j}_c$$

$$\vec{A}''' = \frac{\sqrt{\varepsilon\mu}}{c}\left\{(\vec{\nabla}\varphi)'\left(\frac{\mu'}{\mu} + \frac{\varepsilon'}{\varepsilon}\right) + (\vec{\nabla}\varphi)'' + \frac{\vec{\nabla}\varphi}{2}\left(\frac{\mu''}{\mu} + \frac{\varepsilon''}{\varepsilon}\right) - \frac{\vec{\nabla}\varphi}{4}\left(\frac{\mu'}{\mu} - \frac{\varepsilon'}{\varepsilon}\right)^2\right\} \quad 2$$

$$\vec{A}''' = \mu'\mu_0 \vec{j}_c + \mu\mu_0 \vec{j}'_c$$

Where $\vec{j}_c$ is the density of electric current, $\vec{\nabla}\psi$-gradient of scalar potential, $\mu'=\partial\mu/\partial r, \epsilon'=\partial\epsilon/\partial r$.

It follows from (1) and (2) that random variation over time of $\epsilon$ and $\mu$ on discrete sections of electric power line will lead to the averaging of the second and third directional derivatives of vector potential. The averaging can occur if in the line with distributed parameters the directional derivatives change randomly from point to point. In this case, the spatial distribution of current and voltage in power supply lines is defined by magnetic permeability of the wire. Therefore, random changes of this parameter can lead to the averaging the spatial distribution of current and voltage. It would be preferred to average as often as possible, such as over the shortest length possible. Considering practical considerations, averaging could occur between pairs of neighboring musts.

When the section of the line is short enough, such as between two musts, then due to the quasi-statics distribution of currents and electric charges, directional derivatives of vector potential ($\vec{A}$) will be averaged. Correspondingly, electromagnetic fields formed by this section of electric power transmission line will not be able to cause excitation of chemical bonds in the molecules of the power line material because the electromagnetic field will not have three orders of directional derivatives of vector potential ($\vec{A}$) defined. Thus, self-sustained oscillations in the concurrence of mode conditions can be theoretically prevented or at least reduced.

The distance between power transmission line poles can be chosen as a unit length for sections of the current-conducting part in the power transmission line. The gravitational force inherently acts to pull the wire down and its natural oscillations under the wind can provide an efficient random variation of $\epsilon$. Providing random variation of magnetic permeability $\mu$ on the sections of power transmission lines in conjunction with random variation of $\epsilon$ will act to reduce line loss somewhat. Since line losses result in the undesired effects of electromagnetic field energy radiating from transmission wires, reduction in line losses will also protect surrounding structures, animals and people from harmful EMF emanating from power transmission lines.

Random variation of the effective magnetic permeability $\mu$ on sections of power transmission lines can be provided by disposing variable, such as retunable, inductances $L_i(\alpha)$ in series between the sections of the current-conducting part of power transmission line. Variation, such as re-tuning each inductance can be controlled by the external/internal random/pseudo-random numbers $\alpha_1, \alpha_2, \alpha_3, \ldots$ generator/generators as shown in FIG. 1.

The nominal value of inductance used and the limits of its tunable variation is preferably designed to be comparable to the value of the nominal inductance of the wire on the section of the line between the two nearest retuned inductances. In practice, it should be enough to consider variation limits in the range of 5 to 20% taken from the nominal value of the inductance of the standard section (unit) of the current-conducting part of the power transmission line.

The change of the value of the inductances or re-tuning can be controlled by generator/generators of random/pseudo-random numbers and executed with the use of any suitable device. Examples of suitable devices include mechanical, electric or electro-mechanical devices. Preferably, the respective inductance values are computer controlled, using controllers known in the art.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. The current conducting part of an electrical power transmission line for reducing harmful EMF emissions, comprising:

a plurality of interconnected individual conducting sections, and a plurality of conducting section connectors disposed between said conducting sections, at least one of said section connectors including at least one retunable inductor element connected in series between respective ones of said conducting sections, said retunable inductor having a changeable inductance for causing random variation in magnetic permeability ($\mu$) on adjacent ones of said conducting sections, wherein at least one of first, second and third directional derivatives of vector potential of electromagnetic waves traveling in said adjacent conducting sections are averaged, thereby becoming undefined.

2. The transmission line of claim 1, further comprising at least one random number generator for providing random signals which are applied to said retunable inductor.

3. The transmission line of claim 1, wherein inductance values of said retunable inductors are comparable to an inductance of the section of the wire (cable) enclosed between two of said retunable inductor and a load.

4. The transmission line of claim 1, wherein said retunable inductor is at least one selected from the group consisting of an electrical, mechanical and an electromechanical device.

5. A method of transmitting electric power for reducing harmful EMF emissions, comprising the steps of:

providing a plurality of interconnected individual conducting wire sections, and conducting section connectors disposed between respective ones of said conducting sections, at least one of said section connectors including at least one retunable inductor having a changeable inductance connected in series between respective ones of said conducting sections; and randomly varying said inductance to randomly vary the effective magnetic permeability ($\mu$) of at least one of said adjacent conducting sections, wherein at least one of first, second and third directional derivatives of vector potential of electromagnetic waves traveling in said adjacent conducting section are averaged, thereby becoming undefined.

6. The method of claim 5, wherein said random variation is produced by randomly varying values of said retunable inductor.

7. The method of claim 6, wherein said retunable inductor is at least one selected from the group consisting of an electrical, mechanical and an electromechanical device.

8. The method of claim 5, wherein random variation originates from random signals output by at least one random number generator.

* * * * *